(12) United States Patent
Xin et al.

(10) Patent No.: US 10,135,758 B2
(45) Date of Patent: Nov. 20, 2018

(54) CHIP AND TRANSMISSION SCHEDULING METHOD

(71) Applicant: Huawei Technologies Co., Ltd., Shenzhen (CN)

(72) Inventors: Hengchao Xin, Shenzhen (CN); Han Lin, Shenzhen (CN); Jing Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 15/461,666

(22) Filed: Mar. 17, 2017

(65) Prior Publication Data

US 2017/0272385 A1 Sep. 21, 2017

(30) Foreign Application Priority Data

Mar. 18, 2016 (CN) .......................... 2016 1 0156804

(51) Int. Cl.
*H04L 12/935* (2013.01)
*H04L 12/26* (2006.01)
*H04L 12/933* (2013.01)

(52) U.S. Cl.
CPC .............. *H04L 49/30* (2013.01); *H04L 43/08* (2013.01); *H04L 49/109* (2013.01)

(58) Field of Classification Search
None
See application file for complete search history.

(56) References Cited

U.S. PATENT DOCUMENTS

| 2011/0102011 | A1* | 5/2011 | Van der Plas ............................... G01R 31/318513 324/762.03 |
| 2011/0134705 | A1* | 6/2011 | Jones ...................... G06F 13/16 365/189.02 |
| 2012/0314577 | A1 | 12/2012 | Sun et al. |
| 2016/0239446 | A1* | 8/2016 | Su ......................... G06F 13/368 |

FOREIGN PATENT DOCUMENTS

EP 2339795 A1 6/2011

OTHER PUBLICATIONS

Foreign Communication From a Counterpart Application, European Application No. 17161529.7, Extended European Search Report dated Aug. 24, 2017, 4 pages.

* cited by examiner

*Primary Examiner* — Anh Ngoc M Nguyen
(74) *Attorney, Agent, or Firm* — Conley Rose, P.C.

(57) ABSTRACT

A chip is provided, where the chip is formed by packaging at least two dies, and the at least two dies form at least one die group. The die group includes a first die and a second die. A first processing unit and n groups of ports are disposed on the first die, and a second processing unit and m groups of ports are disposed on the second die. The first processing unit is configured to: switch at least one group of first type ports in the n groups of ports from input to output and switch a second type port that is in the m groups of ports and that is coupled to each group of the first type ports from output to input.

11 Claims, 6 Drawing Sheets

CHIP AND TRANSMISSION SCHEDULING METHOD

CROSS-REFERENCE TO RELATED APPLICATION

This application claims priority to Chinese Patent Application No. 201610156804.X, filed on Mar. 18, 2016, which is hereby incorporated by reference in its entirety.

TECHNICAL FIELD

Embodiments of the present disclosure relate to the field of chips, and in particular, to a chip and a transmission scheduling method.

BACKGROUND

As sizes of chips keep increasing, a single die also has an increasingly large area. To improve a yield of chips, multi-die packaging becomes a feasible solution. The multi-die packaging means that a large die is divided into at least two small dies and the at least two dies are packaged into one chip.

An example of the multi-die packaging is two-die packaging. Two dies (represented by a first die and a second die) are interconnected using 2*128 bit+2*128 bit parallel physical layer ports. Two groups of 128 bit ports have a direction from the first die to the second die, and the other two groups of 128 bit ports have a direction from the second die to the first die.

In the foregoing solution, when data transmission between the two dies is unbalanced, for example, when an amount of data output from the first die to the second die is far greater than an amount of data output from the second die to the first die, the two groups of ports that have a direction from the first die to the second die may not meet a data output requirement, and the two groups of ports that have a direction from the second die to the first die may not be fully utilized. That is, in the prior art, interconnection resources of a physical layer interface between dies cannot be fully utilized, resulting in a problem of resource waste.

SUMMARY

To resolve a prior-art problem that a resource waste may be caused because interconnection resources of a physical layer interface between dies cannot be fully utilized, embodiments of the present disclosure provide a chip and a transmission scheduling method. The technical solutions are as follows.

According to a first aspect, a chip is provided. The chip is formed by packaging at least two dies, the at least two dies form at least one die group, each die group includes a first die and a second die, a first processing unit and n groups of ports are disposed on the first die, and a second processing unit and m groups of ports are disposed on the second die, where n and m are both integers greater than or equal to 1.

In the chip having the foregoing structure, the first processing unit is configured to monitor a queue depth of a processing queue of outputting data from the first die to the second die, and when the queue depth reaches a first preset threshold, by means of handshaking with the second processing unit, switch at least one group of first type ports in the n groups of ports from input to output and switch a second type port that is in the m groups of ports and that is coupled to each group of the first type ports from output to input, where the first type port is a port that can be switched between input and output in the n groups of ports, and the second type port that is coupled to the port can also be switched between input and output.

When the queue depth of the processing queue of outputting data from the first die to the second die reaches the first preset threshold, the at least one group of first type ports in the n groups of ports in the first die are switched from input to output, and the second type port that is in the m groups of ports and that is coupled to each group of the first type ports in the second die is switched from output to input, so that a bandwidth for outputting data from the first die to the second die is increased. The problem of resource waste due to that interconnection resources of a physical layer interface between dies may not be fully utilized in the prior art is resolved, and an effect of increasing a transmission bandwidth on a side having relatively high processing pressure and further increasing a utilization rate of interconnection resources may be achieved. For a switching manner in which the first processing unit switches a port by means of handshaking with the second processing unit, the following two possible implementation manners may be included.

A first possible implementation manner: The first processing unit is further configured to send a first flux request to the second processing unit. When the second processing unit receives the first flux request and detects that a queue depth of a processing queue of outputting data from the second die to the first die is less than a second preset threshold, that is, when a bandwidth needed to output data from the second die to the first die is relatively small, the second processing unit may feed back (FAck) to the first processing unit and disable scheduling of output data of a preset transmission line by the second die. After receiving the FAck, the first processing unit may switch the at least one group of first type ports from input to output, and switch, by means of handshaking with the second processing unit, the second type port that is coupled to the first processing unit from output to input.

As can be understood from the foregoing feature, before the first processing unit switches a transmission direction of the preset transmission line, the first processing unit first sends the first flux request to the second processing unit, and can further execute the switching only when the first processing unit receives first acknowledgment information fed back by the second processing unit, that is, when the queue depth of the processing queue of outputting data from the second die to the first die is less than the second preset threshold, so as to avoid a problem that, after switching is performed, a bandwidth for outputting data from the second die to the first die is insufficient because a quantity of ports for outputting data from the second die to the first die is reduced.

After receiving the FAck, the first processing unit is further configured to switch the at least one group of first type ports from input to output, and send the FAck to the second processing unit. The second processing unit receives the FAck, and after receiving the FAck, switches the second type port that is coupled to the first type port from output to input, and feeds back the FAck to the first processing unit. Subsequently, after the first processing unit receives the FAck, it indicates that the first processing unit and the second processing unit both have completed port switching. In this case, the first processing unit can enable scheduling of output data of the at least one group of first type ports for which switching has been performed. After the scheduling is enabled, the first die can output data to the second die through the at least one group of first type ports.

When the second processing unit feeds back the first acknowledgment information to the first processing unit, the second processing unit can disable scheduling of output data of the second type port. In addition, after the first processing unit switches the at least one group of first type ports in the first processing unit from input to output and the second processing unit switches the second type port from output to input, the first processing unit can enable scheduling of output data of the at least one group of first type ports by the first die, so as to avoid a problem of conflict caused when the first die and the second die output data to each other simultaneously.

A second implementation manner: The first processing unit is further configured to send a second flux request to the second processing unit. Correspondingly, the second processing unit is further configured to receive the second flux request sent by the first processing unit. In addition, the second processing unit switches the second type port that is coupled to the first type port in the second die from output to input after receiving the second flux request, and feeds back fourth acknowledgment information to the first processing unit after the switching succeeds. Correspondingly, the first processing unit may receive the fourth acknowledgment information fed back by the second processing unit, switch the first type port in the first die from input to output, and enable scheduling of output data of the first type port.

Before the second processing unit switches the second type port from output to input, the second processing unit may further first detect whether a queue depth of a processing queue of outputting data from the second die to the first die is less than a second preset threshold, and then switch the second type port from output to input only when the second preset threshold is reached, so as to avoid a problem that, after switching is performed, a bandwidth for outputting data from the second die to the first die is insufficient because a quantity of ports for outputting data from the second die to the first die is reduced.

In addition, in the foregoing solutions, the first processing unit may include a flux detect unit and a direction control unit. The flux detect unit is configured to monitor the queue depth of the processing queue of outputting data from the first die to the second die, detect whether the queue depth reaches the first preset threshold, and send a detection result to the direction control unit. The direction control unit is configured to receive the detection result sent by the flux detect unit, and when the detection result is that the queue depth reaches the first preset threshold, by means of handshaking with the second processing unit, switch the at least one group of first type ports from input to output and switch the second type port that is in the m groups of ports and that is coupled to each group of the first type ports from output to input.

According to a second aspect, a transmission scheduling method is provided. The transmission scheduling method is used in the chip shown in the first aspect, and implements the foregoing functions using a first die and a second die.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
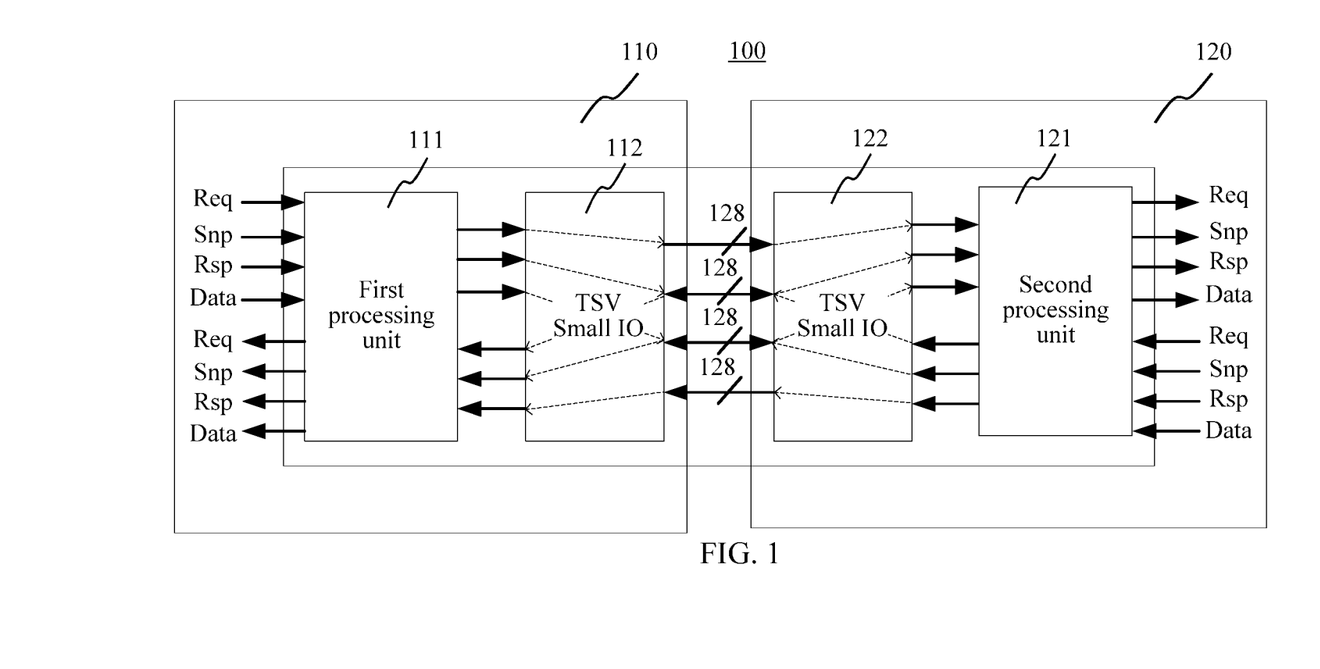
FIG. 1 is a schematic structural diagram of a chip according to an embodiment of the present disclosure.

An embodiment of the present disclosure provides a chip. The chip is formed by packaging at least two dies, the at least two dies form at least one die group, and each die group includes two dies. This embodiment is described using an example in which a chip is formed by packaging two dies and the two dies form one die group. As shown in FIG. 1, FIG. 1 is a schematic structural diagram of the chip 100.

With reference to FIG. 1, the die group includes a first die 110 and a second die 120, a first processing unit 111 and n groups of ports 112 are disposed on the die 110, and a second processing unit 121 and m groups of ports 122 are disposed on the second die 120. n and m are both integers greater than or equal to 1, and values of n and m may be the same or different. n=m=4 is used as an example in the figure.

The first processing unit 111 monitors a queue depth of a processing queue of outputting data from the first die 110 to the second die 120, and when the first processing unit 111 detects that the queue depth reaches a first preset threshold, by means of handshaking with the second processing unit 121, switches at least one group of first type ports in the n groups of ports 112 from input to output and switches a second type port that is in the m groups of ports and that is coupled to each group of the first type ports 122 from output to input. The first type port is a port that can be switched between input and output in the n groups of ports 112, and the second type port that is coupled to the port can also be switched between input and output.

Each group of the ports in the first die 110 may be connected to a group of the ports in the second die 120 through a group of transmission lines. Moreover, an arrow direction of each group of the transmission lines in the figure is a transmission direction of data. For example, with reference to FIG. 1, for a first group of transmission lines (that is, the first transmission line in the figure), a group of ports that correspond to the group of transmission lines in the first die 110 are output ports, a corresponding group of ports in the second die 120 are input ports, and the group of transmission lines are used to output data from the first die 110 to the second die 120. In addition, a transmission line having a two-way arrow in the figure represents that a direction can be changed between an input direction and an output direction. For example, with reference to FIG. 1, for a second group of transmission lines (that is, the second transmission line in the figure), a group of ports that correspond to the group of transmission lines in the first die 110 are output ports, and a corresponding group of ports in the second die 120 are input ports; alternatively, the corresponding group of ports in the first die 110 are input ports, and the corresponding group of ports in the second die 120 are output ports.

A group of ports in this embodiment may include one port, or may include at least two ports. In addition, during data transmission, data on four channels (Req/Snp/Rsp/Data) of a bus is divided into data with fixed length, and then is encapsulated into a 128 bit physical layer Flit and transmitted on a parallel physical layer interface, so that a group of ports in this embodiment generally includes 128 bit ports. In actual implementation, the port may be a novel through-silicon-via small input/output port (TSV Small IO).

In conclusion, according to the chip provided in this embodiment, when a queue depth of a processing queue of outputting data from a first die to a second die reaches a first preset threshold, at least one group of first type ports in n groups of ports in the first die are switched from input to output, and a second type port that is in m groups of ports in the second die and that is coupled to each group of the first type ports is switched from output to input, so that a bandwidth for outputting data from the first die to the second die is increased. A problem of resource waste due to that interconnection resources of a physical layer interface between dies may not be fully utilized in the prior art is resolved, and an effect of increasing a transmission bandwidth on a side having relatively high processing pressure and further increasing a utilization rate of interconnection resources may be achieved.

Figure 2:
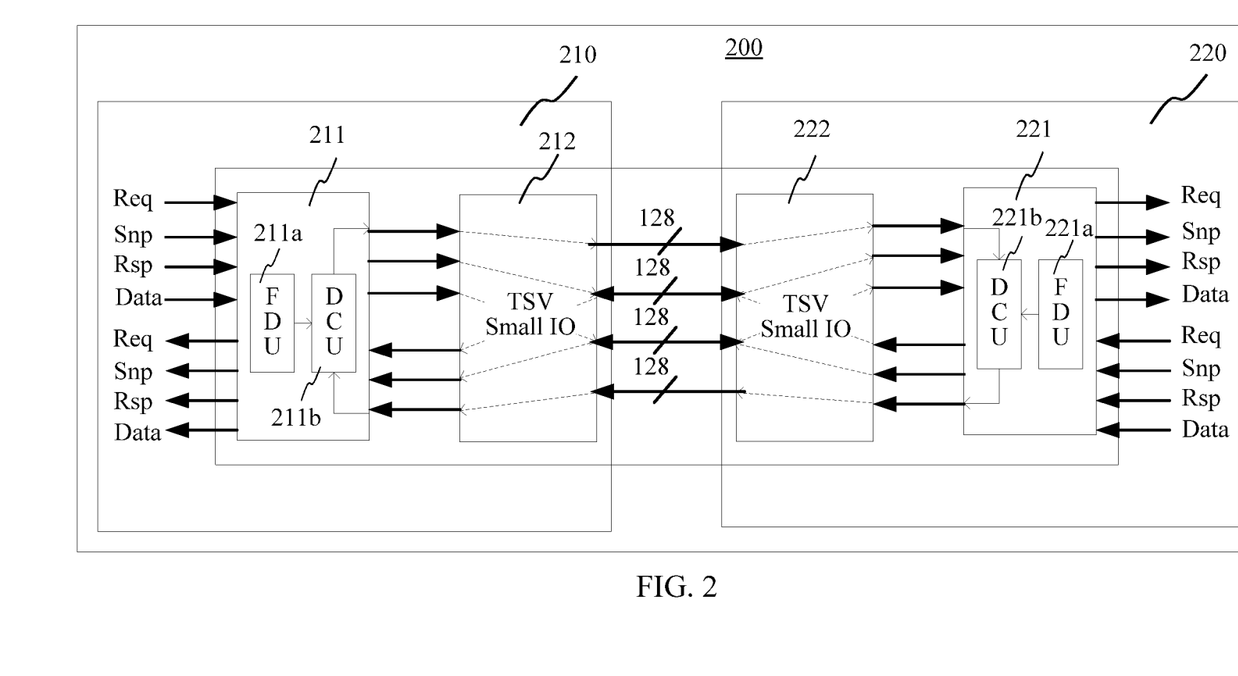
FIG. 2 is a schematic structural diagram of a chip according to another embodiment of the present disclosure.

Another embodiment of the present disclosure provides a chip. The chip is formed by packaging at least two dies, the at least two dies form at least one die group, and each die group includes two dies. Similar to the foregoing embodiment, this embodiment is described still using an example in which a chip is formed by packaging two dies and the two dies form one die group. As shown in FIG. 2, FIG. 2 is a schematic structural diagram of a chip 200.

With reference to FIG. 2, the die group includes a first die 210 and a second die 220, a first processing unit 211 and n groups of ports 212 are disposed on the first die 210, and a second processing unit 221 and m groups of ports 222 are disposed on the second die 220. n and m are both integers greater than or equal to 1, and values of n and m may be the same or different. n=m=4 is used as an example in the figure.

The first processing unit 211 monitors a queue depth of a processing queue of outputting data from the first die 210 to the second die 220, and when the first processing unit 211 detects that the queue depth reaches a first preset threshold, by means of handshaking with the second processing unit 221, switches at least one group of first type ports in the n groups of ports 212 from input to output and switches a second type port that is in the m groups of ports and that is coupled to each group of the first type ports 222 from output to input, where the first type port is a port that can be switched between input and output, and the second type port that is in the m groups of ports and that is coupled to the port can also be switched between input and output.

The first processing unit 211 and the second processing unit 221 separately include a flux detect unit (FDU) and a direction control unit (DCU), where the FDU is configured to monitor a queue depth of a processing queue of outputting data from a local die to another die to which the local die is connected, detect whether the queue depth reaches the first preset threshold, and send a detection result to the DCU; and the DCU is configured to receive the detection result sent by the FDU, and when the detection result is that the queue depth reaches the first preset threshold, by means of handshaking with the another die, switch at least one group of local first type ports from input to output and switch a second type port that is coupled to the first type port in the another die from output to input.

This embodiment is described using an example in which the first processing unit 211 includes an FDU 211a and a DCU 211b, and the second processing unit 221 includes an FDU 221a and a DCU 221b. Moreover, in this embodiment, for example, the detection result received by the DCU 211b is that the queue depth reaches the first preset threshold. When the DCU 211b detects that the detection result sent by the FDU 211a is that the queue depth reaches the first preset threshold, it indicates that a greater bandwidth is needed to output data from the first die 210 to the second die 220. In this case, by means of handshaking with the DCU 221b, the DCU 211b may switch at least one group of first type ports in the n groups of ports 212 and switch the second type port that is in the m groups of ports and that is coupled to each group of the first type ports 222 from output to input.

Generally, by means of handshaking with the DCU 221b, the DCU 211b can switch a group of first type ports from input to output and switch a second type port that is coupled to the group of first type ports from output to input. Therefore, if the n groups of ports 212 include at least two groups of first type ports in a current input state, in this case, the DCU 211b may switch a preset group of ports in the at least two groups of first type ports. For example, n=4, a group of ports are ports that are constantly used for input, another group of ports are ports that are constantly used for output, and the other two groups of ports are first type ports that are in an input state currently. In this case, the first type ports switched by the DCU 211b may be a first group of the two groups of first type ports that are in the input state currently, and when the first group has been switched to output, the DCU 211b may switch the remaining group. This is not limited in this embodiment.

A manner of switching a port by the first processing unit 211 may include the following two manners.

In a first possible implementation manner: the first processing unit sends a first flux request to the second processing unit when the queue depth reaches the first preset threshold.

When the detection result that is sent by the FDU 211a and that is received by the DCU 211b is that the queue depth reaches the first preset threshold, the DCU 211b may send the first flux request (Freq) to the DCU 221b in the second die 220.

The second processing unit 221 receives the first flux request, and feeds back first acknowledgment information to the first processing unit 211 when a queue depth of a processing queue of outputting data from the second die 220 to the first die 210 is less than a second preset threshold.

The DCU 221b receives the Freq sent by the DCU 211b. Moreover, when the FDU 221a detects that the queue depth of the processing queue of outputting data from the second die 220 to the first die 210 is less than the second preset threshold, it indicates that a utilization rate of a bandwidth for outputting data from the second die 220 to the first die 210 is relatively low. In this case, the second die 220 may feed back FAck (Flux Acknowledge) to the DCU 211b using the DCU 221b.

When feeding back the FAck to the DCU 211b, the DCU 221b may disable scheduling of output data of the second type port by the second die 220. After scheduling of output data of the second type port by the second die 220 is disabled, the second die 220 no longer outputs data to the first die 210 using the second type port. In addition, if the FDU 221a detects that the queue depth is not less than the second preset threshold, the second die 220 may feed back rejection information to the DCU 211b using the DCU 221b.

After receiving the first acknowledgment information fed back by the second processing unit 221, the first processing unit 211 switches the at least one group of first type ports from input to output, and switches the second type port that is coupled to the at least one group of first type ports from output to input by means of handshaking with the second processing unit 221.

After the DCU 211b receives the FAck fed back by the DCU 221b, the DCU 211b may switch the at least one group of first type ports from input to output, and switch the second type port from output to input. Optionally, if the DCU 211b receives the rejection information fed back by the DCU 221b, in this case, the procedure ends, and details are no longer described herein again in this embodiment.

A manner of switching, by the first processing unit 211, the at least one group of first type ports from input to output, and switching the second type port from output to input after the first processing unit 211 receives the first acknowledgement information may include switching, by the first processing unit 211, the at least one group of first type ports from input to output, and sending second acknowledgment information to the second processing unit 221.

An enable terminal that corresponds to each group of the first type ports is disposed in advance on the first die 210, and the DCU 211b switches the first type port to input or output using the enable terminal. For example, when a signal applied to the enable terminal is '1', the first type port is used as an output port, and when the signal applied to the enable terminal is '0', the first type port is used as an input port. Therefore, when the DCU 211b needs to switch the first type port from input to output, the signal applied to the enable terminal only needs to be switched from '0' to '1'.

The DCU 211b sends FAck to the DCU 221b after switching the first type port from input to output. Optionally, when the DCU 211b switches the first type port, the DCU 211b may further switch a back-pressure signal from output to input. Each group of ports corresponds to a back-pressure signal line, so that the DCU 211b may switch the back-pressure signal line that corresponds to each group of first type ports from output to input.

The second processing unit 221 receives the second acknowledgment information, switches the second type port from output to input after receiving the second acknowledgment information, and sends third acknowledgment information to the first processing unit 211.

The DCU 221b receives the FAck sent by the DCU 211b, and after receiving the FAck, switches the second type port from output to input. A manner of switching the second type port from output to input by the DCU 221b is similar to the manner of switching the first type port from input to output by the DCU 211b, and details are no longer described herein again in this embodiment.

The DCU 221b sends FAck to the DCU 211b after switching the second type port from output to input.

Optionally, when the DCU 221b switches the second type port, the DCU 221b may further switch a back-pressure signal from input to output. Each group of ports corresponds to a back-pressure signal line, so that the DCU 221b may switch the back-pressure signal that corresponds to the second type port from input to output.

The first processing unit 211 receives the third acknowledgment information sent by the second processing unit 221, and enables scheduling of output data of the first type port by the first die 210.

The DCU 211b receives the FAck sent by the DCU 221b, and enables scheduling of output data of the first type port after receiving the FAck. Subsequently, the first die 210 can output data to the second die 220 using the switched first type port.

In a second possible implementation manner, the first processing unit 211 is further configured to send a second flux request to the second processing unit 221 when the queue depth reaches the first preset threshold.

This is similar to the first possible implementation manner, and details are no longer described herein again.

The second processing unit 221 is configured to receive the second flux request sent by the first processing unit 211, switch the second type port in the second die 220 from output to input, and feed back fourth acknowledgment information to the first processing unit 211.

When a queue depth of a processing queue of outputting data from the second die 220 to the first die 210 is less than a second preset threshold, the DCU 221b may switch the second type port from output to input. Similar to the first implementation manner, an enable terminal may be disposed for each group of second type ports, and the DCU 221b switches the second type port form output to input using the enable terminal. Details are no longer described herein again in this embodiment.

The first processing unit 211 is further configured to receive the fourth acknowledgment information sent by the second processing unit 221, and after receiving the fourth acknowledgment information, switch the first type port in the first die 210 from input to output, and enable scheduling of output data of the first type port.

The DCU 211b switches the first type port from input to output after receiving the fourth acknowledgment information. The specific switching manner is similar to the switching manner in the first implementation manner, and details are no longer described herein again in this embodiment.

Optionally, when the DCU 211b switches the first type port, the DCU 211b may further switch a back-pressure signal from output to input. Each group of ports corresponds to a back-pressure signal line, so that the DCU 211b may switch the back-pressure signal that corresponds to the switched first type port from output to input.

In the second possible implementation manner, because the first type port and the second type port connected to the first type port may be in an input state at the same time, to avoid a problem of high impedance, pull-down may be disposed on pins of the first die 210 and the second die 220. This is not limited in this embodiment.

In addition, it should be noted that, to ensure normal communication between the first die 210 and the second die 220, that is, the first die 210 may output data to the second die 220 and the second die 220 may also output data to the first die 210, the n groups of ports 212 include at least one group of output ports that are configured to output data to the second die 220 and at least one group of input ports that are configured to receive data output by the second die 220. Correspondingly, the m groups of ports 222 include at least one group of input ports that are configured to receive data output by the first die 210 and at least one group of output ports that are configured to output data to the first die 210. The input ports and output ports herein are ports that are constantly used for input and output. In actual implementation, the port may be a port having both input and output functions, and is only designated to be constantly used for input or output in a scenario of this embodiment. Certainly, the port may also be a port having only an input or output function. This is not limited in this embodiment. Moreover, when the DCU 211b sends information to the DCU 221b, the information is transmitted using the port that is in the first die 210 and that is constantly used for output and the port that is in the second die 220 and that is constantly used for input. Similarly, when the DCU 221b sends information to the DCU 211b, the information is transmitted using the port that is in the second die 220 and that is constantly used for output and the port that is in the first die 210 and that is constantly used for input. The information herein includes the Freq, the FAck and a Skyros packet in this embodiment. Certainly, in the actual implementation, the information may also be transmitted between the first die 210 and the second die 220 using the first type port and the second type port. This is not strictly limited in this embodiment.

In conclusion, according to the chip provided in this embodiment, when a queue depth of a processing queue of outputting data from a first die to a second die reaches a first preset threshold, at least one group of first type ports in n groups of ports in the first die are switched from input to output, and a second type port that is in m groups of ports in the second die and that is coupled to each group of the first type ports is switched from output to input, so that a bandwidth for outputting data from the first die to the second die is increased. A problem of resource waste due to that interconnection resources of a physical layer interface between dies may not be fully utilized in the prior art is resolved, and an effect of increasing a transmission bandwidth on a side having relatively high processing pressure and further increasing a utilization rate of interconnection resources may be achieved.

Before the first processing unit switches a port, the first processing unit first sends a first flux request to the second processing unit, and can further execute the switching only when the first processing unit receives first acknowledgment information fed back by the second processing unit, that is, when the queue depth of the processing queue of outputting data from the second die to the first die is less than the second preset threshold, so as to avoid a problem that bandwidth for outputting data from the second die to the first die is insufficient because a quantity of channels for transmitting data from the second die to the first die is reduced.

In addition, in this embodiment, when the second processing unit feeds back the first acknowledgment information to the first processing unit, the second processing unit can disable scheduling of output data of the second type port. Moreover, after the first processing unit switches the first type port in the first die from input to output and the second processing unit switches the second type port in the second die from output to input, the first processing unit can enable scheduling of output data of the first type port by the first die, so as to avoid a problem of conflict caused when the first processing unit and the second processing unit output data to each other simultaneously using a same transmission path.

Figure 3:
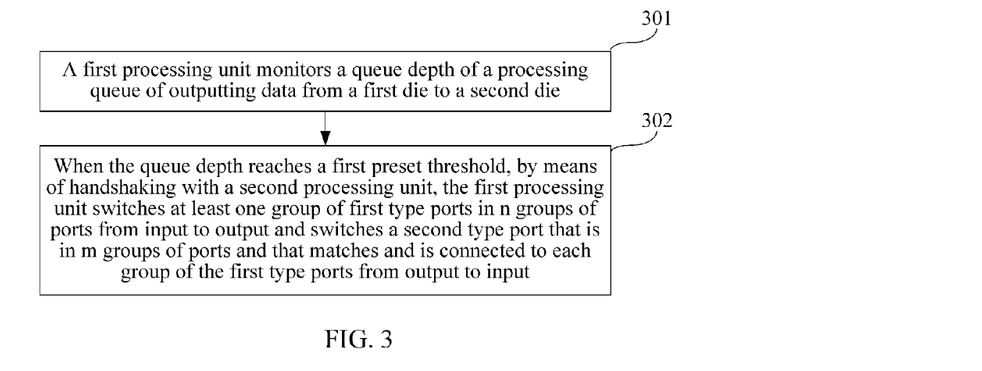
FIG. 3 is a method flowchart of a transmission scheduling method according to an embodiment of the present disclosure.

Referring to FIG. 3, FIG. 3 is a method flowchart of a transmission scheduling method according to an embodiment of the present disclosure. This embodiment is described using an example in which the transmission scheduling method is applied to the chip shown in FIG. 1 or FIG. 2. As shown in FIG. 3, the transmission scheduling method may include the following.

Step 301: A first processing unit monitors a queue depth of a processing queue of outputting data from a first die to a second die.

Step 302: When the queue depth reaches a first preset threshold, by means of handshaking with a second processing unit, the first processing unit switches at least one group of first type ports in n groups of ports from input to output and switches a second type port that is in m groups of ports and that is coupled to each group of the first type ports from output to input.

The first type port is a port that can be switched between input and output in the n groups of ports, and the second type port that is coupled to the port can also be switched between input and output.

In conclusion, according to the transmission scheduling method provided in this embodiment, when a queue depth of a processing queue of outputting data from a first die to a second die reaches a first preset threshold, at least one group of first type ports in n groups of ports in the first die are switched from input to output, and a second type port that is in m groups of ports in the second die and that is coupled to each group of the first type ports is switched from output to input, so that a bandwidth for outputting data from the first die to the second die is increased. A problem of resource waste due to that interconnection resources of a physical layer interface between dies may not be fully utilized in the prior art is resolved, and an effect of increasing a transmission bandwidth on a side having relatively high processing pressure and further increasing a utilization rate of interconnection resources may be achieved.

It should be noted that step 302 may include the following two possible implementation manners.

In a first possible implementation manner, the first processing unit sends a first flux request to the second processing unit when the queue depth reaches the first preset threshold; the second processing unit receives the first flux request, and when a queue depth of a processing queue of outputting data from the second die to the first die is less than a second preset threshold, feeds back first acknowledgment information to the first processing unit, and disables scheduling of output data of the second type port by the second die; and the first processing unit receives the first acknowledgment information fed back by the second processing unit, switches the at least one group of first type ports from input to output, and switches the second type port that is coupled to the at least one group of first type ports from output to input by means of handshaking with the second processing unit.

In a second possible implementation manner, the first processing unit sends a second flux request to the second processing unit when the queue depth reaches the first preset threshold; the second processing unit receives the second flux request, switches the second type port that is coupled to the first type port from output to input, and feeds back fourth acknowledgment information to the first processing unit; and the first processing unit receives the fourth acknowledgment information, switches the at least one group of first type ports from input to output, and enables scheduling of output data of the at least one group of first type ports by the first die.

Therefore, the foregoing two cases are described separately below in two different embodiments.

Figure 4A:
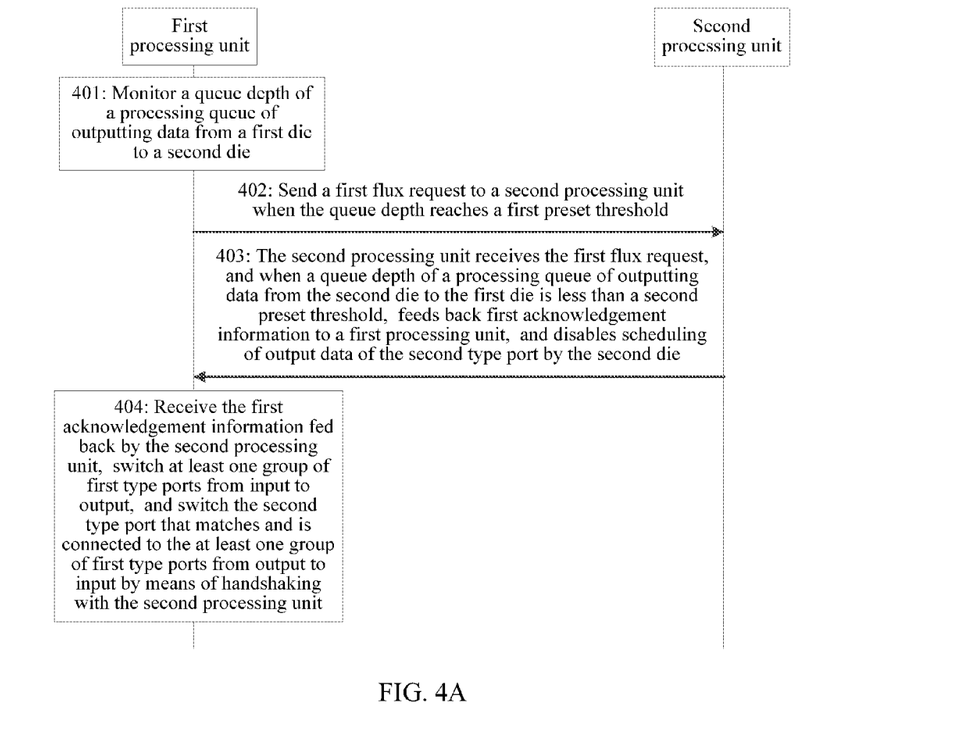
FIG. 4A is a method flowchart of a transmission scheduling method according to another embodiment of the present disclosure.

Referring to FIG. 4A, FIG. 4A is a method flowchart of a transmission scheduling method according to another embodiment of the present disclosure. This embodiment is described using an example in which the transmission scheduling method is applied to the chip shown in FIG. 1 or FIG. 2 and switching is implemented using the first possible implementation manner. As shown in FIG. 4A, the transmission scheduling method may include the following steps.

Step 401: A first processing unit monitors a queue depth of a processing queue of outputting data from a first die to a second die.

The first processing unit in the first die may include an FDU and a DCU, and the first die may monitor the queue depth of the processing queue of outputting data from the first die to the second die using the FDU.

Optionally, after monitoring the queue depth, the FDU may detect whether the queue depth reaches a first preset threshold, and send a detection result to the DCU. Correspondingly, the DCU may receive the detection result.

Step 402: The first processing unit sends a first flux request to a second processing unit when the queue depth reaches the first preset threshold.

If the detection result received by the DCU in the first processing unit is that the queue depth reaches the first preset threshold, it indicates that a greater bandwidth is needed to output data from the first die to the second die. In this case, the first processing unit may send a Freq to the second processing unit using the DCU.

In actual implementation, the second processing unit in the second die may further include an FDU and a DCU, and functions of the FDU and the DCU are similar to those of the corresponding components in the first die. Therefore, the first die may send the FReq to the DCU in the second processing unit using the DCU in the first processing unit.

Step 403: The second processing unit receives the first flux request, and when a queue depth of a processing queue of outputting data from the second die to the first die is less than a second preset threshold, feeds back first acknowledgment information to the first processing unit, and disables scheduling of output data of the second type port by the second die.

Correspondingly, the DCU in the second processing unit receives the Freq sent by the DCU in the first processing unit. Moreover, when the FDU in the second processing unit detects that the queue depth of the processing queue of outputting data from the second die to the first die is less than the second preset threshold, it indicates that a utilization rate of a bandwidth from the second die to the first die is relatively low. In this case, to fully utilize a bandwidth resource between the first die and the second die, the DCU in the second processing unit may send, to the DCU in the first processing unit, acknowledgment information that is used to acknowledge that the first type port is switched to an output port and the second type port is switched to an input port.

Optionally, if the FDU in the second processing unit detects that the queue depth is greater than the second preset threshold, it indicates that a greater bandwidth is needed to output data from the second die to the first die. In this case, the DCU in the second processing unit may feed back rejection information to the DCU in the first processing unit.

When the DCU in the second processing unit feeds back the first acknowledgment information to the DCU in the first processing unit, it indicates that the second die acknowledges that port switching may be performed. In this case, the DCU in the second processing unit may disable scheduling of output data of the second type port, that is, disable TX scheduling. After the TX scheduling is disabled, the second die does not output data to the first die using the second type port.

Step 404: The first processing unit receives the first acknowledgment information fed back by the second processing unit, switches the at least one group of first type ports from input to output, and switches the second type port that is coupled to the at least one group of first type ports from output to input by means of handshaking with the second processing unit.

Optionally, this step may include the following.

First, the first processing unit switches the at least one group of first type ports from input to output, and sends second acknowledgment information to the second processing unit.

The DCU in the first processing unit switches the first type port from inputting data to outputting data after receiving FAck. Assuming that a signal applied to a corresponding enable terminal of a port is '1', it indicates that the port is used as an output port. However, when the signal applied to the enable terminal is '0', it indicates that the port is used as an input port, and the DCU in the first processing unit may control that a signal applied to an enable terminal corresponding to the first type port is switched from '0' to '1'.

After the DCU in the first processing unit executes the switching, the DCU in the first processing unit sends the FAck to the DCU in the second processing unit. When the DCU in the first processing unit switches the first type port from input to output, the DCU in the first processing unit may further switch a back-pressure signal from output to input. Details are no longer described herein again in this embodiment. Each group of ports corresponds to a back-pressure signal line, so that the DCU may switch the back-pressure signal line that corresponds to the first type port from output to input.

However, if the first processing unit receives the rejection information, the procedure ends, and details are no longer described herein again in this embodiment.

Second, the second processing unit receives the second acknowledgment information, and after receiving the second acknowledgment information, switches the second type port that is coupled to the first type port from output to input, and sends third acknowledgment information to the first processing unit.

The DCU in the second processing unit may correspondingly receive the FAck sent by the DCU in the first processing unit, switch the second type port from output to input after receiving the FAck, and send the FAck to the DCU in the first processing unit after the switching. A manner of switching the second type port from output to input by the DCU in the second processing unit is similar to the manner of switching the first type port from input to output by the DCU in the first processing unit, and details are no longer described herein again in this embodiment.

When the DCU in the second processing unit switches the second type port from output to input, the DCU in the second processing unit may further switch the back-pressure signal from input to output. Details are no longer described herein again in this embodiment. Each group of ports corresponds to a back-pressure signal line, so that the DCU may switch the back-pressure signal line that corresponds to the second type port from input to output.

Third, the first processing unit receives the third acknowledgment information sent by the second processing unit, and enables scheduling of output data of the at least one group of first type ports by the first die.

After the DCU in the first die receives the FAck sent by the DCU in the second die, it indicates that the first die and the second die have switched the ports, and both the first die and the second die may perform normal data transmission using the switched ports. In this case, the DCU in the first processing unit may enable scheduling of output data of the first type port, that is, enable transmission (TX) scheduling.

After the scheduling of output data of the first type port is enabled, the first die may normally transmit data to the second die using the first type port.

Figure 4B:
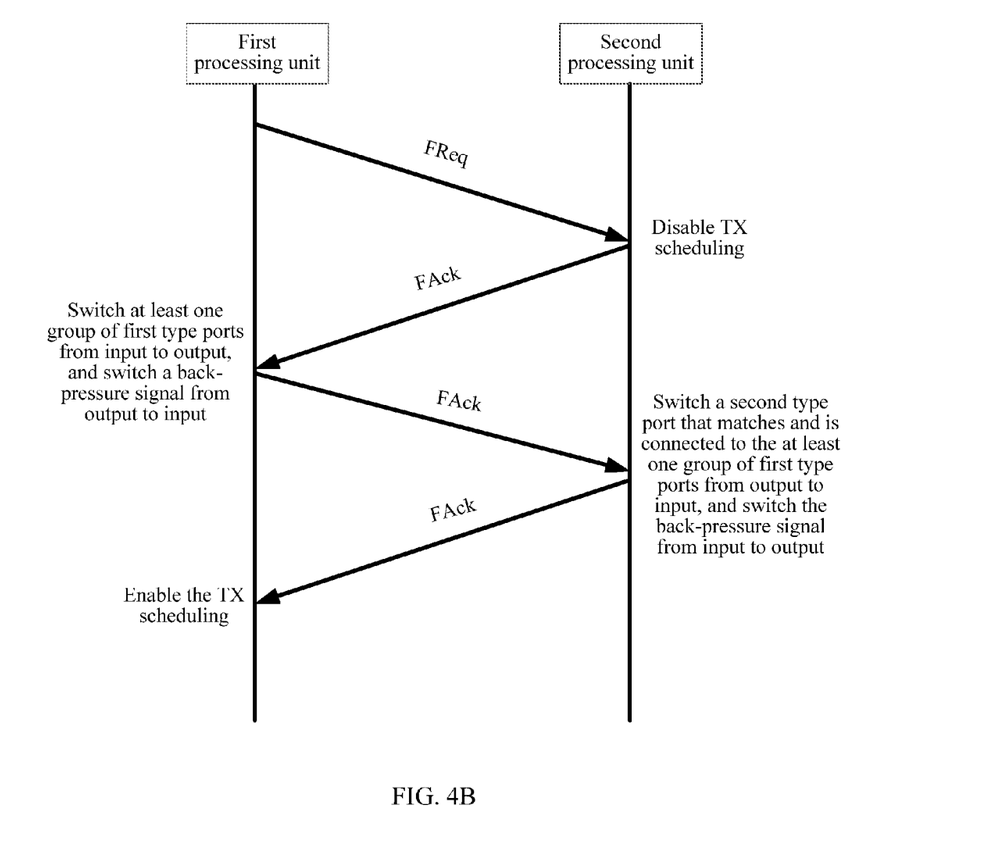
FIG. 4B is a flowchart of switching a port by a first processing unit according to another embodiment of the present disclosure.

In combination with the content, for a procedure of switching a port by the first processing unit, reference may be made to FIG. 4B.

In conclusion, according to the transmission scheduling method provided in this embodiment, when a queue depth of a processing queue of outputting data from a first die to a second die reaches a first preset threshold, at least one group of first type ports in n groups of ports in the first die are switched from input to output, and a second type port that is in m groups of ports in the second die and that is coupled to each group of the first type ports is switched from output to input, so that a bandwidth for outputting data from the first die to the second die is increased. A problem of resource waste due to that interconnection resources of a physical layer interface between dies may not be fully utilized in the prior art is resolved, and an effect of increasing a transmission bandwidth on a side having relatively high processing pressure and further increasing a utilization rate of interconnection resources may be achieved.

Before the first processing unit switches a port, the first processing unit first sends a first flux request to the second processing unit, and can further execute the switching only when the first processing unit receives first acknowledgment information fed back by the second processing unit, that is, when the queue depth of the processing queue of outputting data from the second die to the first die is less than the second preset threshold, so as to avoid a problem that bandwidth for outputting data from the second die to the first die is insufficient because a quantity of channels for transmitting data from the second die to the first die is reduced.

In addition, in this embodiment, when the second processing unit feeds back the first acknowledgment information to the first processing unit, the second processing unit can disable scheduling of output data of the second type port. Moreover, after the first processing unit switches the first type port in the first die from input to output and the second processing unit switches the second type port in the second die from output to input, the first processing unit can enable scheduling of output data of the first type port by the first die, so as to avoid a problem of conflict caused when the first processing unit and the second processing unit output data to each other simultaneously using a same transmission path.

Figure 5A:
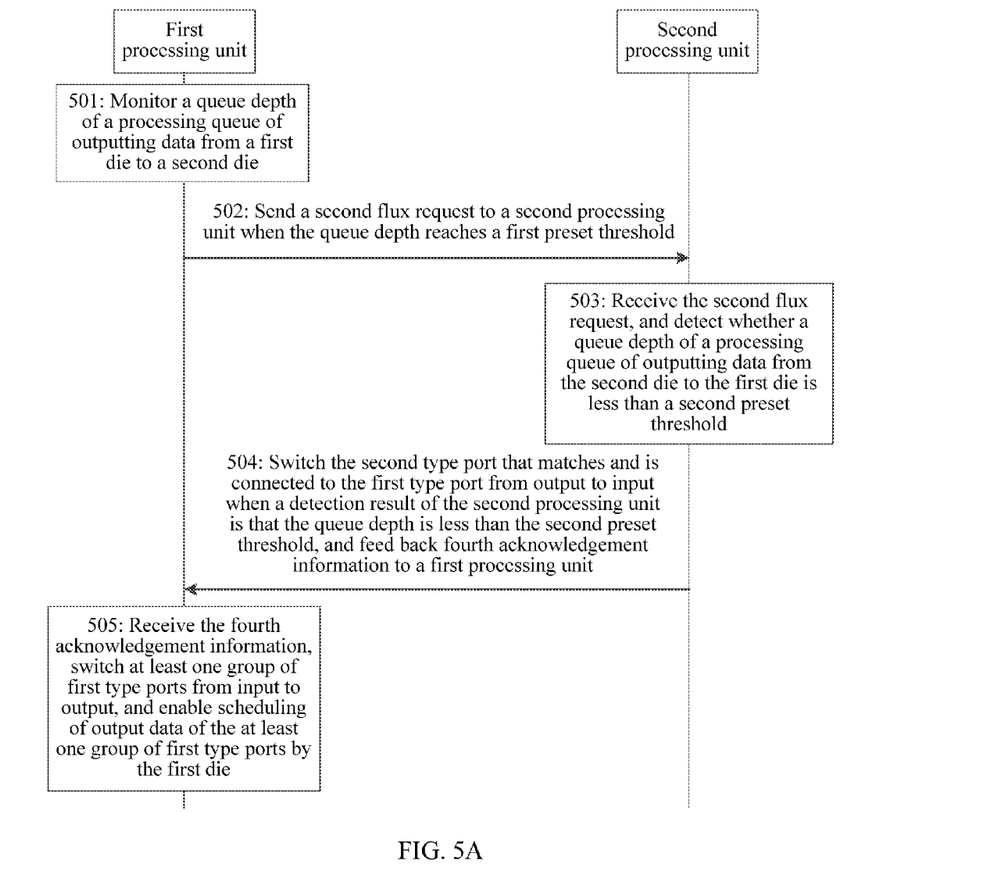
FIG. 5A is a method flowchart of a transmission scheduling method according to another embodiment of the present disclosure.

Referring to FIG. 5A, FIG. 5A is a method flowchart of a transmission scheduling method according to another embodiment of the present disclosure. This embodiment is described using an example in which the transmission scheduling method is applied to the chip shown in FIG. 1 or FIG. 2 and switching is implemented using the second possible implementation manner. As shown in FIG. 5A, the transmission scheduling method may include the following steps.

Step 501: A first processing unit monitors a queue depth of a processing queue of outputting data from a first die to a second die.

The first processing unit may include an FDU and a DCU, and the first processing unit may monitor the queue depth of the processing queue of outputting data from the first die to the second die using the FDU.

Optionally, after monitoring the queue depth, the FDU may detect whether the queue depth reaches a first preset threshold, and send a detection result to the DCU. Correspondingly, the DCU may receive the detection result.

Step 502: The first processing unit sends a second flux request to a second processing unit when the queue depth reaches the first preset threshold.

If the detection result received by the DCU is that the queue depth reaches the first preset threshold, it indicates that a greater bandwidth is needed to output data from the first die to the second die. In this case, the first processing unit may send a FReq to the second processing unit using the DCU.

In actual implementation, the second processing unit may further include an FDU and a DCU, and functions of the FDU and the DCU are similar to the corresponding components in the first processing unit. Therefore, the first processing unit may send the FReq to the DCU in the second processing unit using the DCU.

Step 501 and step 502 are similar to step 401 and step 402 in the foregoing embodiment, and details are no longer described herein again in this embodiment.

Step 503: The second processing unit receives the second flux request, and detects whether a queue depth of a processing queue of outputting data from the second die to the first die is less than a second preset threshold.

This step is similar to step 501, and details are no longer described herein again.

Step 504: When the detection result of the second processing unit is that the queue depth is less than the second preset threshold, the second processing unit switches the second type port that is coupled to the first type port from output to input, and feeds back fourth acknowledgment information to the first processing unit.

If the detection result is that the queue depth is less than the second preset threshold, it indicates that a utilization rate of a bandwidth for outputting data from the second die to the first die is relatively low. In this case, to fully utilize a bandwidth resource, the second processing unit may switch the second type port in the second die from output to input. Optionally, when the switching is performed, the second processing unit may switch a back-pressure signal from input to output. Each group of ports corresponds to a back-pressure signal line, so that the DCU in the second processing unit may switch the back-pressure signal line that corresponds to the second type port from input to output.

After switching the second type port from output to input, the second processing unit may further feed back fourth acknowledgment information FAck to the first processing unit. Therefore, the second processing unit may feed back the FAck to the DCU in the first processing unit using the DCU.

Step 505: The first processing unit receives the fourth acknowledgment information, switches the at least one group of first type ports from input to output, and enables scheduling of output data of the at least one group of first type ports by the first die.

Correspondingly, the first processing unit receives the FAck fed back by the second processing unit, and switches the first type port in the first die from input to output after receiving the FAck.

Moreover, after the switching is executed, to output data to the second die using the first type port, the first die may enable scheduling of output data of the first type port.

Figure 5B:
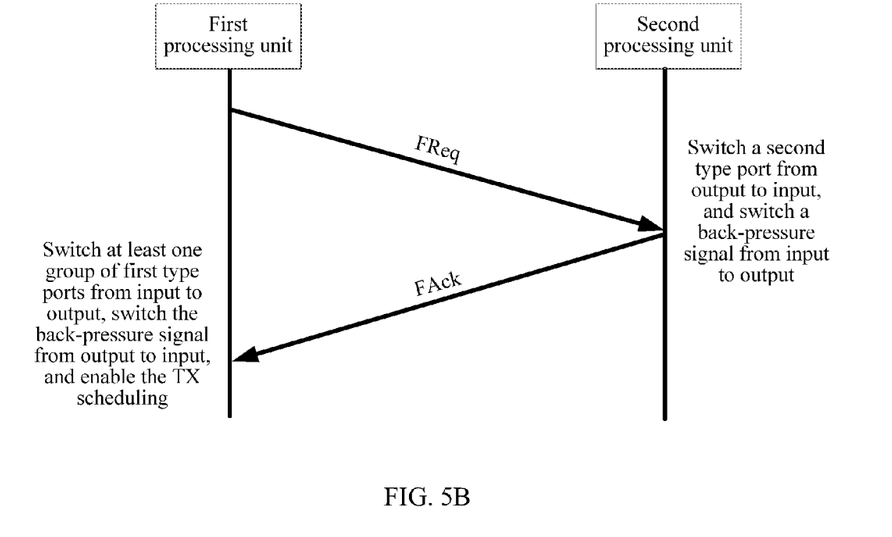
FIG. 5B is a flowchart of switching a port by a first processing unit according to another embodiment of the present disclosure.

In combination with the content, for a procedure of switching a port by the first die, reference may be made to FIG. 5B.

It should be further noted that, in this embodiment, because the first type port and the second type port may be in an input state at the same time, to avoid a problem of high impedance, pull-down may be disposed on pins of the first die and the second die. This is not limited in this embodiment.

In conclusion, according to the transmission scheduling method provided in this embodiment, when a queue depth of a processing queue of outputting data from a first die to a second die reaches a first preset threshold, at least one group of first type ports in n groups of ports in the first die are switched from input to output, and a second type port that is in m groups of ports in the second die and that is coupled to each group of the first type ports is switched from output to input, so that a bandwidth for outputting data from the first die to the second die is increased. A problem of resource waste due to that interconnection resources of a physical layer interface between dies may not be fully utilized in the prior art is resolved, and an effect of increasing a transmission bandwidth on a side having relatively high processing pressure and further increasing a utilization rate of interconnection resources may be achieved.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A chip formed by packaging at least two dies, wherein the at least two dies form at least one die group, and wherein the at least one die group comprises:
   a first die;
   a second die in communication with the first die;
   a first processor and n groups of ports disposed on the first die; and
   a second processor and m groups of ports disposed on the second die,
   wherein n and m are both integers greater than or equal to 1, and
   wherein the first processor is configured to:
      monitor a queue depth of a processing queue of outputting data from the first die to the second die; and
      switch at least one group of first type ports in the n groups of ports from input to output and switch a second type port in the m groups of ports and coupled to each group of the first type ports from output to input when the queue depth reaches a first preset threshold, by means of handshaking with the second processor,
   wherein the first type port is a port that can be switched between input and output in the n groups of ports, and
   wherein the second type port coupled to the port can also be switched between input and output.

2. The chip according to claim 1, wherein the first processor is further configured to send a first flux request to the second processor when the queue depth reaches the first preset threshold, wherein the second processor is configured to:
   receive the first flux request;
   feed back first acknowledgment information to the first processor when a queue depth of a processing queue of outputting data from the second die to the first die is less than a second preset threshold; and
   disable scheduling of output data of the second type port by the second die, and
   wherein the first processor is further configured to:
      receive the first acknowledgment information fed back by the second processor;
      switch the at least one group of first type ports from input to output; and
      switch the second type port coupled to the at least one group of first type ports from output to input by means of handshaking with the second processor.

3. The chip according to claim 2, wherein the first processor is further configured to:
   switch the at least one group of first type ports from input to output; and
   send second acknowledgment information to the second processor,
   wherein the second processor is further configured to:
      receive the second acknowledgment information;
      switch the second type port coupled to the first type port from output to input after receiving the second acknowledgment information; and
      send third acknowledgment information to the first processor, and
   wherein the first processor is further configured to:
      receive the third acknowledgment information sent by the second processor; and
      enable scheduling of output data of the at least one group of first type ports by the first die.

4. The chip according to claim 1, wherein the first processor is further configured to send a second flux request to the second processor when the queue depth reaches the first preset threshold, wherein the second processor is configured to:
   receive the second flux request;
   switch the second type port coupled to the first type port from output to input; and
   feed back fourth acknowledgment information to the first processor, and
   wherein the first processor is further configured to:
      receive the fourth acknowledgment information;
      switch the at least one group of first type ports from input to output; and
      enable scheduling of output data of the at least one group of first type ports by the first die.

5. The chip according to claim 4, wherein the second processor is further configured to:
   switch the second type port coupled to the first type port from output to input when a queue depth of a processing queue of outputting data from the second die to the first die is less than a second preset threshold; and
   feed back the fourth acknowledgment information to the first processor.

6. The chip according to claim 1, wherein the first processor comprises:
   a direction control unit; and
   a flux detector coupled to the direction control unit, wherein the flux detector is configured to:
   monitor the queue depth of the processing queue of the data output from the first die to the second die;
   detect whether the queue depth reaches the first preset threshold; and
   send a detection result to the direction control unit, and
   wherein the direction control unit is configured to:
   receive the detection result sent by the flux detector; and
   switch the at least one group of first type ports from input to output and switch the second type port in the m groups of ports and coupled to each group of the first type ports from output to input when the detection result is that the queue depth reaches the first preset threshold, by means of handshaking with the second processor.

7. A transmission scheduling method applied to a chip formed by packaging at least two dies, wherein the at least two dies form at least one die group, wherein the at least one die group comprises a first die and a second die, a first processor and n groups of ports disposed on the first die, and a second processor and m groups of ports disposed on the second die, wherein n and m are both integers greater than or equal to 1, and wherein the method comprises:
   monitoring, by the first processor, a queue depth of a processing queue of outputting data from the first die to the second die; and
   switching, by the first processor by means of handshaking with the second processor, at least one group of first type ports in the n groups of ports from input to output when the queue depth reaches a first preset threshold, and
   switching a second type port in the m groups of ports and coupled to each group of the first type ports from output to input, wherein the first type port is a port that can be switched between input and output in the n groups of ports, and wherein the second type port coupled to the port can also be switched between input and output.

8. The method according to claim 7, wherein switching, by the first processor by means of handshaking with the second processor, the at least one group of first type ports in the n groups of ports from input to output when the queue depth reaches the first preset threshold, and switching the second type port in the m groups of ports and coupled to each group of the first type ports from output to input comprises:
   sending, by the first processor, a first flux request to the second processor when the queue depth reaches the first preset threshold;
   receiving, by the second processor, the first flux request;
   feeding back first acknowledgment information to the first processor when a queue depth of a processing queue of outputting data from the second die to the first die is less than a second preset threshold;
   disabling scheduling of output data of the second type port by the second die;
   receiving, by the first processor, the first acknowledgment information fed back by the second processor;
   switching the at least one group of first type ports from input to output; and
   switching the second type port coupled to the at least one group of first type ports from output to input by means of handshaking with the second processor.

9. The method according to claim 8, wherein switching the at least one group of first type ports from input to output, and switching the second type port coupled to the at least one group of first type ports from output to input by means of handshaking with the second processor comprises:
   switching, by the first processor, the at least one group of first type ports from input to output;
   sending second acknowledgment information to the second processor;
   receiving, by the second processor, the second acknowledgment information;
   switching the second type port coupled to the first type port from output to input after receiving the second acknowledgment information;
   sending third acknowledgment information to the first processor;
   receiving, by the first processor, the third acknowledgment information sent by the second processor; and
   enabling scheduling of output data of the at least one group of first type ports by the first die.

10. The method according to claim 7, wherein switching, by the first processor by means of handshaking with the second processor, at least one group of first type ports in the n groups of ports from input to output when the queue depth reaches the first preset threshold, and switching the second type port in the m groups of ports and coupled to each group of the first type ports from output to input comprises:
    sending, by the first processor, a second flux request to the second processor when the queue depth reaches the first preset threshold;
    receiving, by the second processor, the second flux request;
    switching the second type port coupled to the first type port from output to input;
    feeding back fourth acknowledgment information to the first processor;
    receiving, by the first processor, the fourth acknowledgment information;
    switching the at least one group of first type ports from input to output; and
    enabling scheduling of output data of the at least one group of first type ports by the first die.

11. The method according to claim 10, wherein before switching the second type port coupled to the first type port from output to input, the method further comprises:
    detecting whether a queue depth of data output from the second die to the first die is less than a second preset threshold; and
    executing the step of switching the second type port coupled to the first type port from output to input when the queue depth is less than the second preset threshold.

* * * * *